US008381995B2

(12) United States Patent
Faith et al.

(10) Patent No.: US 8,381,995 B2
(45) Date of Patent: *Feb. 26, 2013

(54) PAYMENT CARD DYNAMICALLY RECEIVING POWER FROM EXTERNAL SOURCE

(75) Inventors: Patrick L. Faith, Pleasanton, CA (US); Steven M. Twombly, Saco, ME (US)

(73) Assignees: Visa U.S.A., Inc., San Francisco, CA (US); Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/182,688

(22) Filed: Jul. 14, 2011

(65) Prior Publication Data

US 2012/0012660 A1    Jan. 19, 2012

Related U.S. Application Data

(63) Continuation of application No. 11/685,109, filed on Mar. 12, 2007, now Pat. No. 8,002,193.

(51) Int. Cl.
*G06K 19/06* (2006.01)
(52) U.S. Cl. ........................................ 235/492
(58) Field of Classification Search .................. 235/380, 235/449, 492, 493
See application file for complete search history.

(56) References Cited

U.S. PATENT DOCUMENTS

| | | | |
|---|---|---|---|
| 4,720,860 A | 1/1988 | Weiss | |
| 4,800,590 A | 1/1989 | Vaughan | |
| 4,819,267 A | 4/1989 | Cargile et al. | |
| 5,060,263 A | 10/1991 | Bosen et al. | |
| 5,122,643 A * | 6/1992 | Gamou et al. | 235/384 |
| 5,168,520 A | 12/1992 | Weiss | |
| 5,182,767 A | 1/1993 | Bernard | |
| 5,216,716 A | 6/1993 | Bernard | |
| 5,361,062 A | 11/1994 | Weiss et al. | |
| 5,412,192 A | 5/1995 | Hoss | |
| 5,432,851 A | 7/1995 | Scheidt et al. | |

(Continued)

FOREIGN PATENT DOCUMENTS

| | | |
|---|---|---|
| EP | 1338940 | 8/2003 |
| EP | 1378870 | 1/2004 |

(Continued)

OTHER PUBLICATIONS

On-Line E-wallet System with Decentralized Credential Keepers. Mobile Networks and Applications 8 (online). The Netherlands: Kluwer Academic Publishers 2003 (retrieved on Apr. 27, 2008). pp. 87-99.

(Continued)

*Primary Examiner* — Seung Lee
(74) *Attorney, Agent, or Firm* — Kilpatrick Townsend & Stockton

(57) ABSTRACT

A payment card with a display and/or dynamic magnetic stripe that operates using power received from an electromagnetic/RF signal, without the need for incorporating a battery within the payment card. In one example, a payment card includes a receiver for receiving an external electromagnetic signal and converting it to an electrical signal for powering the payment card; a CPU coupled with the electrical signal of the receiver; a display (i.e., a persistent display) for displaying data, wherein the display receives power based on the electrical signal from the receiver; and a dynamic magnetic stripe storing magnetically readable data, wherein the dynamic magnetic stripe receives power based on the electrical signal from the receiver. Responsive to the electro-magnetic signal received by the payment card, the data displayed on the display and stored in the dynamic magnetic stripe is changed. Methods relating to a payment card are also disclosed.

25 Claims, 8 Drawing Sheets

U.S. PATENT DOCUMENTS

| | | | |
|---|---|---|---|
| 5,577,121 A | 11/1996 | Davis et al. |
| 5,592,553 A | 1/1997 | Guski et al. |
| 5,627,355 A | 5/1997 | Rahman et al. |
| 5,638,444 A | 6/1997 | Chou et al. |
| 5,657,388 A | 8/1997 | Weiss |
| 5,661,807 A | 8/1997 | Guski et al. |
| 5,859,913 A | 1/1999 | Goreta et al. |
| 5,887,065 A | 3/1999 | Audebert |
| 5,937,068 A | 8/1999 | Audebert |
| 5,963,643 A | 10/1999 | Goreta et al. |
| 6,067,621 A | 5/2000 | Yu et al. |
| 6,163,771 A | 12/2000 | Walker |
| 6,375,082 B1 | 4/2002 | Kobayashi et al. |
| 6,445,780 B1 | 9/2002 | Rosset et al. |
| 6,457,650 B1 | 10/2002 | Suzuki et al. |
| 6,609,654 B1 | 8/2003 | Adnerson et al. |
| 6,628,198 B2 | 9/2003 | Fieschi et al. |
| 6,641,050 B2 | 11/2003 | Kelley et al. |
| 6,704,715 B1 | 3/2004 | Rosset et al. |
| 6,715,082 B1 | 3/2004 | Chang et al. |
| 6,928,558 B1 | 8/2005 | Allahwerdi et al. |
| 6,952,781 B1 | 10/2005 | Chang et al. |
| 6,957,185 B1 | 10/2005 | Labaton |
| 7,003,501 B2 | 2/2006 | Ostroff |
| 7,156,313 B2 | 1/2007 | Ou et al. |
| 7,270,276 B2 | 9/2007 | Vayssiere |
| 7,494,066 B2 | 2/2009 | Koyama et al. |
| 7,942,338 B2 | 5/2011 | Koyama et al. |
| 2001/0054148 A1 | 12/2001 | Hoornaert et al. |
| 2001/0056409 A1 | 12/2001 | Bellovin et al. |
| 2002/0116617 A1 | 8/2002 | Talton, Sr. |
| 2002/0133713 A1 | 9/2002 | Fieschi et al. |
| 2002/0198848 A1 | 12/2002 | Michener |
| 2003/0011731 A1 | 1/2003 | Yoshida et al. |
| 2003/0046551 A1 | 3/2003 | Brennan |
| 2003/0084304 A1 | 5/2003 | Hon et al. |
| 2003/0126094 A1 | 7/2003 | Fisher et al. |
| 2003/0135739 A1 | 7/2003 | Talton, Sr. |
| 2003/0182241 A1 | 9/2003 | Everhart |
| 2003/0204732 A1 | 10/2003 | Audebert et al. |
| 2003/0208449 A1 | 11/2003 | Diao |
| 2003/0212894 A1 | 11/2003 | Buck et al. |
| 2004/0026495 A1 | 2/2004 | Finkelstein |
| 2004/0026506 A1 | 2/2004 | Finkelstein |
| 2004/0031856 A1 | 2/2004 | Atsmon et al. |
| 2004/0059952 A1 | 3/2004 | Newport et al. |
| 2004/0064706 A1 | 4/2004 | Lin et al. |
| 2004/0202325 A1 | 10/2004 | Margalit et al. |
| 2004/0255119 A1 | 12/2004 | Ukeda et al. |
| 2005/0015588 A1 | 1/2005 | Lin et al. |
| 2005/0043997 A1 | 2/2005 | Sahota et al. |
| 2005/0050330 A1 | 3/2005 | Agam et al. |
| 2005/0067485 A1 | 3/2005 | Caron |
| 2005/0069137 A1 | 3/2005 | Landrock |
| 2005/0133605 A1 | 6/2005 | Koyama et al. |
| 2005/0166263 A1 | 7/2005 | Nanopoulos et al. |
| 2005/0182927 A1 | 8/2005 | Shatford |
| 2005/0182971 A1 | 8/2005 | Ong et al. |
| 2005/0188202 A1 | 8/2005 | Popp |
| 2005/0239440 A1 | 10/2005 | Chen et al. |
| 2005/0240528 A1 | 10/2005 | Hendrick |
| 2005/0269402 A1 | 12/2005 | Spitzer et al. |
| 2006/0015358 A1 | 1/2006 | Chua |
| 2006/0049263 A1 | 3/2006 | Ou et al. |
| 2006/0059346 A1 | 3/2006 | Sherman et al. |
| 2006/0065741 A1 | 3/2006 | Vayssiere |
| 2006/0124756 A1 | 6/2006 | Brown |
| 2006/0161789 A1 | 7/2006 | Doughty et al. |
| 2006/0174113 A1 | 8/2006 | Zahari |
| 2006/0242698 A1 | 10/2006 | Inskeep et al. |
| 2006/0287964 A1 | 12/2006 | Brown |
| 2007/0136211 A1 | 6/2007 | Brown et al. |
| 2008/0029607 A1 | 2/2008 | Mullen |
| 2008/0035738 A1 | 2/2008 | Mullen |
| 2008/0110983 A1 | 5/2008 | Ashfield |
| 2009/0236428 A1 | 9/2009 | Koyama et al. |
| 2011/0221272 A1 | 9/2011 | Koyama et al. |

FOREIGN PATENT DOCUMENTS

| | | |
|---|---|---|
| GB | 2387999 A | 10/2003 |
| JP | 2005-122108 A | 5/1993 |
| JP | 2003-315760 A2 | 11/2003 |
| JP | 2004-021288 A2 | 1/2004 |
| JP | 2005-202943 A2 | 7/2005 |
| JP | 2006-072445 A2 | 3/2006 |
| JP | 2006-099781 A2 | 4/2006 |
| WO | 93/23826 A1 | 11/1993 |
| WO | WO 93/23826 A1 | 11/1993 |
| WO | WO 0048064 | 8/2000 |
| WO | WO 0163515 A1 | 8/2001 |
| WO | WO 0167335 A | 9/2001 |
| WO | WO 0167355 A2 | 9/2001 |
| WO | 2005-074157 A1 | 8/2005 |
| WO | 2006-116772 A2 | 11/2006 |

OTHER PUBLICATIONS

Pocket Device for authentication and data integrity on Internet banking applications. IEEE 0-7802/03 (online), (retrieved on Apr. 25, 2008). pp. 43-50.

Bank of America Corporation et al., "International Preliminary Report on Patentability." Jul. 3, 2007.

European Patent Office, Examination Report, Apr. 29, 2010, 5pgs.

European Patent Office, Examination Report, Mar. 4, 2008, issued in European Patent Application No. 06758494.6.

Database Inspec (online), The Institution of Electrical Engineers, Stevenage, GB; Feb. 14, 2007, Molloy et al.: "Dynamic Virtual Credit Card Numbers", XP002480516, Database accession No. 9721118, the whole document.

Bank of America Corporation, PCT International Search Report, issued in corresponding International Patent Application No. PCT/US2007/084529, Jun. 4, 2008.

Bank of America Corporation, PCT Written Opinion, issued in corresponding International Patent Application No. PCT/US2007/084529, Jun. 4, 2008.

European Office Action for European Application No. 07844939.4. Date mailed Aug. 16, 2012, 4 pages.

Japanese Office Action for Application No. 2009-553569. Mailed Sep. 24, 2012, 25 pages.

* cited by examiner

PAYMENT CARD DYNAMICALLY RECEIVING POWER FROM EXTERNAL SOURCE

This application is a continuation application of U.S. patent application Ser. No. 11/685,109, filed on Mar. 12, 2007, PAYMENT DYNAMICALLY RECEIVING POWER FROM EXTERNAL SOURCE, now issued U.S. Pat. No. 8,002,193 which is a non provisional application. The contents of all of the above applications are hereby incorporated by reference in their entirety for all purposes.

FIELD

This invention relates, in general, to payment cards such as but not limited to credit cards and debit cards.

BACKGROUND

Payment cards, such as credit cards and debit cards, have been created that include a small battery on each card to provide enhanced functionality for users and card holders. A trend in the payment card field has included the addition or integration of a long-life battery into a payment card.

For instance, payment cards have been developed which include displays that display information to a user or cardholder, wherein the display draws its power from the battery included in the payment card. Similarly, payment cards have been developed which utilize batteries to supply power to a dynamic magnetic stripe, wherein dynamic data can be magnetically written to the magnetic stripe on a card so as to provide enhanced levels of fraud protection. Such dynamic magnetic stripe mechanisms on a conventional payment card are generally powered by a battery located within the payment card.

However, as recognized by the present inventors, the inclusion of a battery into a payment card can create design complexities and also generally increases the cost of manufacturing the payment card. Moreover, a payment card having a battery should be disposed of properly as with any product that contains a battery.

SUMMARY

According to one broad aspect of one embodiment of the present invention, disclosed herein is a payment card that in one example includes a receiver for receiving an external electro-magnetic signal, the receiver converting the electro-magnetic signal to an electrical signal for powering the payment card; a CPU coupled with the electrical signal of the receiver, the CPU generating one or more data signals; a display (i.e., a persistent display) for displaying data, the display receiving at least one of the one or more data signals from the CPU, wherein the display receives power based on the electrical signal from the receiver, and responsive to the electro-magnetic signal received by the payment card, the CPU changes the data displayed on the display. In this manner, the payment card can be provided with a display without the need for incorporating a battery within the payment card.

In another embodiment, the payment card may also include a dynamic magnetic stripe storing magnetically readable data, the dynamic magnetic stripe receiving at least one of the one or more data signals from the CPU, wherein the dynamic magnetic stripe receives power based on the electrical signal from the receiver, and responsive to the electro-magnetic signal received by the payment card, the CPU changes the magnetically readable data stored by the dynamic magnetic stripe.

In another example, the payment card may also include one or more energy storage elements for storing energy received from the electro-magnetic signal, the one or more storage elements coupled with the voltage regulator. One or more level shifting circuits may be provided and can be coupled with the one or more outputs of the voltage regulator, the one or more level shifting circuits converting a voltage at a first voltage level from the voltage regulator to a second voltage at a second voltage level, the second voltage adapted to be coupled with the display.

According to another broad aspect of another embodiment of the present invention, disclosed herein is a payment card that in another example includes a receiver for receiving an electro-magnetic signal, the receiver converting the electro-magnetic signal to an electrical signal for powering the payment card; a voltage regulator coupled with the receiver, the voltage regulator receiving the electrical signal and providing one or more regulated voltage signals; a CPU receiving at least one of the one or more regulated voltage signals, the CPU generating one or more data signals; and a dynamic magnetic stripe storing magnetically readable data, the dynamic magnetic stripe receiving at least one of the one or more regulated voltage signals, the dynamic magnetic stripe receiving at least one of the one or more data signals, wherein based in part on the electro-magnetic signal received by the payment card, the CPU changes one or more portions of the magnetically readable data contained in the dynamic magnetic stripe. In this manner, the payment card can have the benefits of a dynamic magnetic stripe without the need for a battery in the payment card.

In another embodiment, the payment card may also include one or more energy storage elements for storing energy received from the electro-magnetic signal, the one or more storage elements coupled with the voltage regulator. One or more level shifting circuits may be provided and can be coupled with the one or more outputs of the voltage regulator, the one or more level shifting circuits converting a voltage at a first voltage level from the voltage regulator to a second voltage at a second voltage level, the second voltage adapted to be coupled with the display.

If desired, the payment card may be provided with a display (such as a persistent display) for displaying data, the display receiving at least one of the one or more regulated voltage signals, the display receiving at least one of the one or more data signals, wherein based in part on the electro-magnetic signal received by the payment card, the CPU changes the data displayed by the display.

According to another broad aspect of another embodiment of the present invention, disclosed herein is a method for controlling a payment card. In one example, the method may include the operations of providing a display on the payment card; providing a receiver on the payment card, the receiver adapted to receive an electro-magnetic signal and adapted to convert the electro-magnetic signal into electrical power; providing for applying the electrical power to the display; and providing for changing the contents of the display responsive to the electrical power applied to the display.

The method may also include providing a dynamic magnetic stripe on the payment card; and providing for changing the contents of the dynamic magnetic stripe responsive to the electrical power applied to the display.

The method may also include providing the payment card with one or more energy storage elements for storing energy received from the electro-magnetic signal.

In one example, the operation of changing the contents of the display may include writing new data to the display, and the operation of changing the contents of the dynamic magnetic stripe may include includes writing new data to the dynamic magnetic stripe.

The method may also include providing a voltage regulator coupled with the receiver, the voltage regulator providing one or more regulated output voltages; and coupling the one or more regulated output voltages with the display. The method may also include providing one or more level shifting circuits coupled with the one or more regulated output voltages of the voltage regulator, the one or more level shifting circuits converting a voltage at a first voltage level from the voltage regulator to a second voltage at a second voltage level, the second voltage adapted to be coupled with the display.

According to another broad aspect of another embodiment of the present invention, disclosed herein is a method for operating a payment card. In one example, the method may include receiving an electro-magnetic signal; converting said electro-magnetic signal to an electrical signal; regulating the electrical signal to form one or more regulated voltage signals; applying at least one of the one or more regulated voltage signals to a CPU; applying at least one of the one or more regulated voltage signals to a display; and writing data to the display.

The method may also include applying at least one of the one or more regulated voltage signals to a dynamic magnetic stripe; and storing magnetically readable data on the dynamic magnetic stripe. Energy received from the electro-magnetic signal may be stored.

According to another broad aspect of another embodiment of the present invention, disclosed herein is a method for operating a payment card. In one example, the method may include receiving an electro-magnetic signal; converting said electro-magnetic signal to an electrical signal; regulating the electrical signal to form one or more regulated voltage signals; applying at least one of the one or more regulated voltage signals to a CPU; applying at least one of the one or more regulated voltage signals to a dynamic magnetic stripe; and storing magnetically readable data on the dynamic magnetic stripe.

According to another broad aspect of another embodiment of the present invention, disclosed herein is a payment card. In one example, the payment card may include means for receiving an external electro-magnetic signal; means for converting said electro-magnetic signal to one or more electrical signals for powering the payment card; means for generating one or more data signals, said means for generating coupled with the one or more electrical signals; and means for displaying data, the means for displaying coupled with the one or more electrical signals.

In another example, the payment card may also include means for storing magnetically readable data, the means for storing coupled with the one or more electrical signals. The payment card may also include means for storing energy, said means for storing coupled with the one or more electrical signals.

According to another broad aspect of another embodiment of the present invention, disclosed herein is a payment card that may include means for receiving an external electro-magnetic signal; means for converting said electro-magnetic signal to one or more electrical signals for powering the payment card; means for generating one or more data signals, said means for generating coupled with the one or more electrical signals; and means for storing magnetically readable data, the means for storing coupled with the one or more electrical signals. The payment card may also include means for displaying data, the means for displaying coupled with the one or more electrical signals, and means for storing energy, said means for storing coupled with the one or more electrical signals.

The features, utilities and advantages of the various embodiments of the invention will be apparent from the following more particular description of embodiments of the invention as illustrated in the accompanying drawings.

DETAILED DESCRIPTION

Embodiments of the present invention provide a payment card that dynamically receives power from an external source (i.e., without the use of a battery) while providing card functionality such as a persistent display and/or a dynamic magnetic stripe. In one example, a payment card is provided with a persistent display for displaying data, and/or a dynamic magnetic stripe; and the payment card dynamically receives power from an external source, such as an electro-magnetic field, and utilizes that power to effect a state change in the data being displayed by the display, and/or utilizes that power to effect a state change in the data contained within the dynamic magnetic stripe of the payment card. In this manner, security features such as a display and/or a dynamic magnetic stripe can be incorporated into a payment card without the need for a battery within the payment card. Various embodiments of the present invention are described herein.

Figure 1:
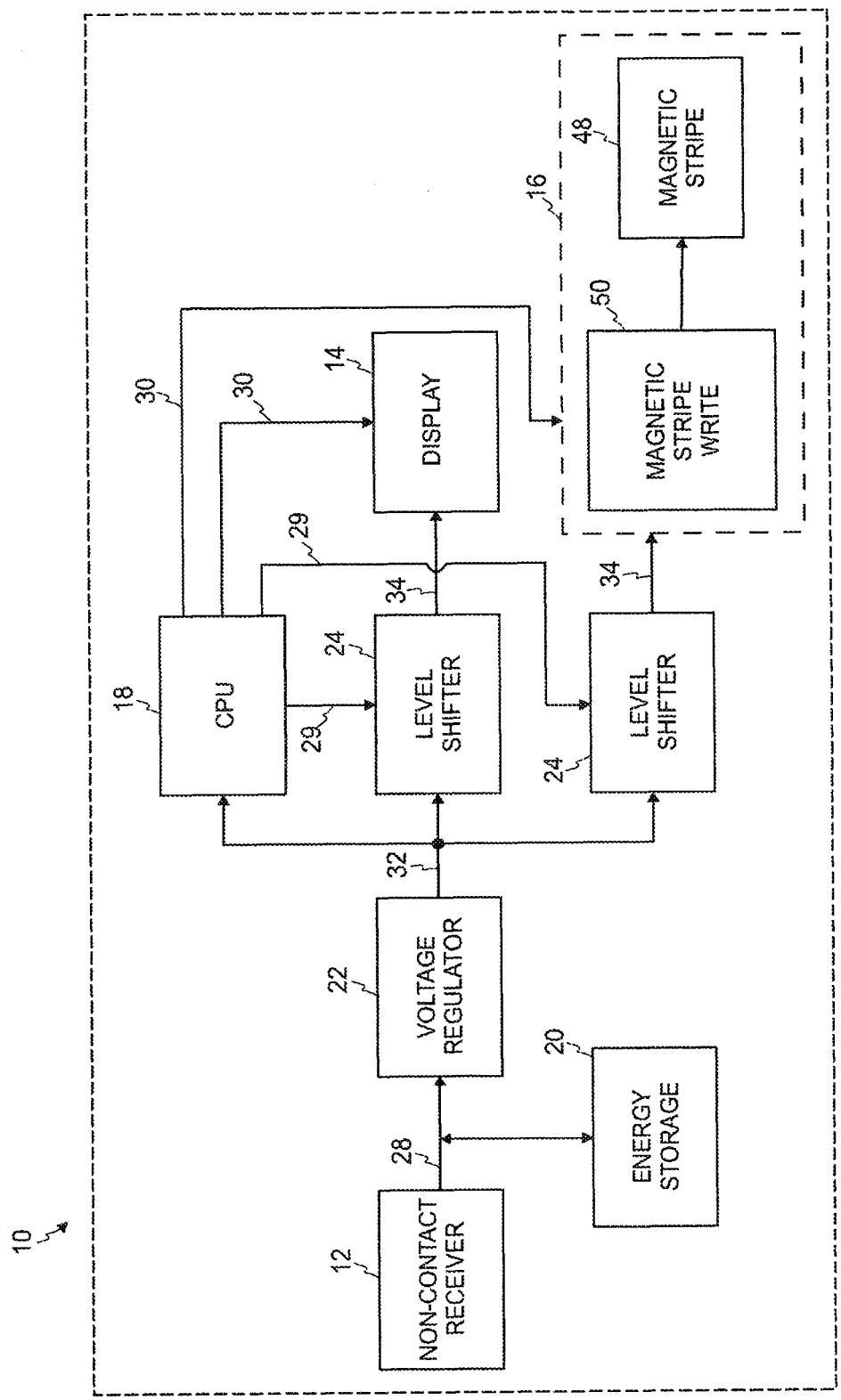
FIG. 1 illustrates a block diagram of one example of a payment card, in accordance with one embodiment of the present invention.

Referring to FIG. 1, an example of a payment card 10 is shown according to one embodiment of the present invention. The payment card 10 in the example of FIG. 1 includes a receiver 12, a display 14 for displaying data or information, and a dynamic magnetic stripe 16 for storing magnetically readable data. The payment card 10 may also include a CPU 18 (central processing unit), energy storage elements 20, a voltage regulator 22, and one or more level shifters 24.

The receiver 12 is provided for receiving an external electro-magnetic signal 26 (FIG. 2) and for converting said electro-magnetic signal 26 to electrical power (i.e., an electrical signal 28) for powering the payment card 10. A CPU 18 is provided and may be coupled (directly or indirectly) with the electrical signal 28 of the receiver 12. The CPU 18 may generate one or more data signals 30, a portion of the data signals 30 may be coupled with the display 14, and another (or the same) portion of the data signals 30 may be coupled with the dynamic magnetic stripe 16. For example, the display 14 may receive power (directly or indirectly) based on the electrical signal 28 from the receiver 12, and the dynamic magnetic stripe 16 may receive power (directly or indirectly) based on the electrical signal 28 from the receiver 12. Responsive to the electro-magnetic signal 26 received by the payment card 10, the data displayed on the display 14 can be changed, and the magnetically readable data stored by the dynamic magnetic stripe 16 can be changed, if desired.

As used herein, the term "payment card" includes but is not limited to, for example, credit cards, debit cards, bank cards, store-issued cards, prepaid cards, contactless cards, gift cards, a card combining one or more of these functions, or any conventional payment card that a customer can use in lieu of a cash payment, and these terms are used interchangeably herein.

In accordance with embodiments of the present invention, a payment card 10 may be provided with a display 14; a payment card 10 may be provided with a dynamic magnetic stripe 16; or a payment card 10 may be provided with both a display 14 and a dynamic magnetic stripe 16, depending upon the particular implementation.

In one example, the output 28 of the contactless receiver 12 is a voltage signal, such as a DC voltage, which may include but is not limited to a low voltage such as approximately 1.25 volts.

In one example, a voltage regulator 22 may be provided within the payment card 10, wherein the voltage regulator 22 is coupled with the output 28 of the contactless receiver 12. The voltage regulator 22 may provide a stable or regulated output voltage 32 for use by other components within the payment card 10. For instance, the voltage regulator 22 may include circuit elements such as diodes, resistors, or capacitors for stabilizing the output signal 28 received from the contactless receiver 12 and providing a regulating voltage 32 to the other components within the payment card 10. The voltage regulator 22 may include any conventional circuits or components for providing a regulated voltage 32 or for stabilizing the voltage 32 on the output on the voltage regulator 22.

Energy storage elements or circuits 20 may be provided within the payment card 10, in one example. The energy storage elements 20 may be coupled with the output 28 of the contactless receiver 12, in one example, in order to store energy received from the contactless receiver 12 and provide that energy to the input of the voltage regulator 22, as shown in FIG. 1. Alternatively or additionally, storage elements 20 may be placed on the output 32 of the voltage regulator 22 so as to store energy and provide that energy (voltage/current) to the components downstream of the voltage regulator 22 within the payment card 10. The energy storage elements 20 may include but are not limited to capacitors, inductors, or other conventional energy storage elements or conventional circuits providing energy storage.

In one example, one or more level shifters, voltage conversion circuits, or voltage translator circuits 24 may be provided in order to provide or create the voltage levels 34 utilized by the display 14 or by the dynamic magnetic stripe 16.

For instance, if the voltage output 32 from the voltage regulator 22 is, as an example only, approximately 3.5 volts and the display 14 requires a voltage of approximately 40 volts (as an example only) in order to write new data to the display 14, then a level shifter/voltage translator 24 may be provided to convert the 3.5 volts signal to a 40 volt signal, in one example.

Alternatively, a voltage regulator 22 may be provided with multiple output voltage signals 32, each output voltage signal being at a different voltage level in order to supply the voltages for the CPU 18, display 14, and/or dynamic magnetic stripe 16 or other components.

The one or more level shifters/voltage translators 24 may utilize any conventional circuit or mechanism for shifting a voltage signal, depending upon the particular implementation.

Generally, the contactless receiver 12 receives the electro-magnetic (EM)/radio frequency (RF) signal 26 from the card reader device 40 (FIG. 2) and that electro-magnetic signal 26 is converted into electrical energy/power (i.e., voltages and currents) that can be utilized by the circuit components of the payment card 10. The CPU 18 is then activated based on the power received from the external electro-magnetic field 26, and the CPU 18 can then change the state of the display 14 by controllably writing data (i.e., new data values) to the display 14. Likewise the CPU 18 can change the state of the dynamic magnetic stripe 16 by writing data (i.e., new data) to the dynamic magnetic stripe 16.

As shown in FIG. 1, the CPU 18 is powered based on the energy received from the external source, the electro-magnetic field 26. The CPU 18 may have one or more outputs 29,30, for instance, one or more outputs 29,30 coupled to control the display 14 (these signals may be data signals 30, control signals 29, or both), and or one or more outputs 29,30 to control the dynamic magnetic stripe 16 (these signals may be data signals 30, control signals 29, or both). The CPU 18 may also include other outputs which can be utilized to activate or de-activate other circuit elements within the payment card, such as to selectively enable or selectively disable circuit sections of the payment card 10 in order to conserve energy or efficiently utilize energy.

The CPU 18 may include, but is not limited to, any logic circuit, integrated circuit, programmable logic device, microprocessor, microcontroller, or other conventional processing and may include other components which are conventionally associated with a CPU, such as on-board or external memory, interface circuits, timing circuits, clock circuits, or other conventional circuits, depending upon the particular implementation. If desired, the CPU 18 may be compliant with the publicly available EMVCo Specification "EMV Card Personalization Specification" June 2003 v1.0, available at http://www.emvco.com/specifications.asp, the disclosure of which is hereby incorporated by reference in its entirety.

The display 14 may include, but is not limited to, a persistent display which, once written, will display the desired data and will persistently maintain the display of that data until the display is re-written or otherwise changed. The display 14 can be, for example, a fixed segment display, a dot matrix display, a positive or negative reflective display which can be read by the user or cardholder using ambient light, a liquid crystal display, or other conventional display.

Figure 3:
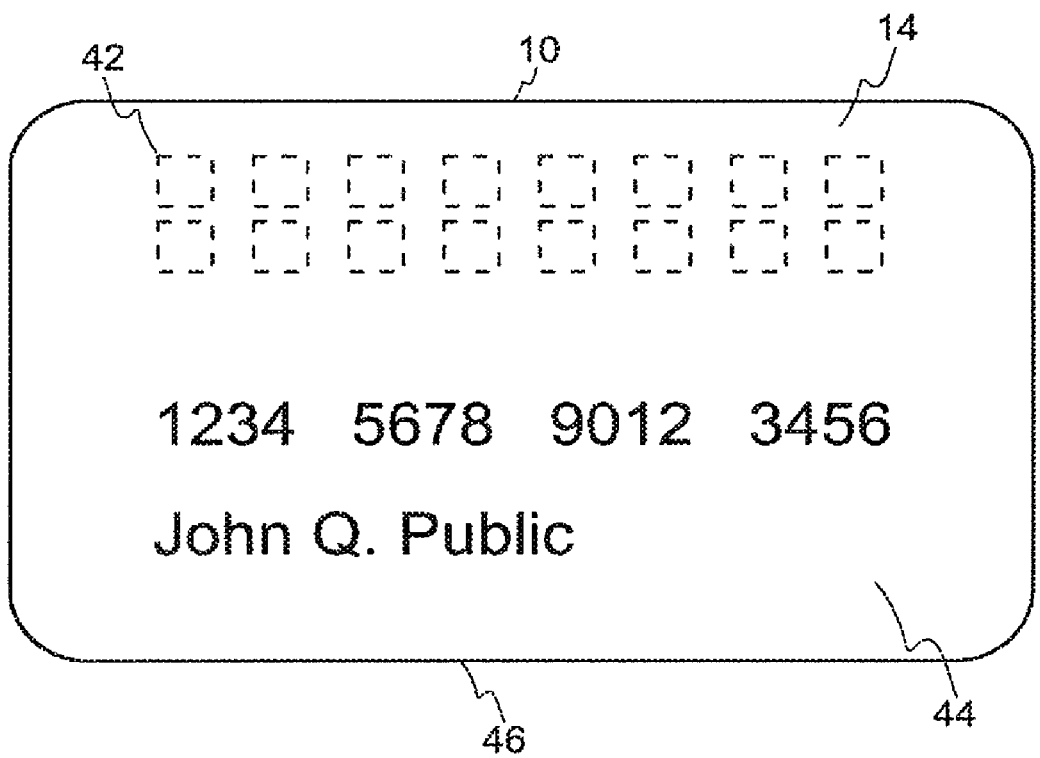
FIG. 3 illustrates an example of a payment card having a persistent display portion, in accordance with one embodiment of the present invention.

As shown in FIG. 3, the display 14 may include, for example, a set of fixed segment characters 42 that may be positioned on the front side 44 of the card, or in other embodiments can be positioned on the backside 46 of the card. In another embodiment, portions of the display 14 may be positioned on the front side 44 of the payment card 10 and other portions of the display 14 may be positioned on the rear surface 46 of the payment card 10.

Figure 4:
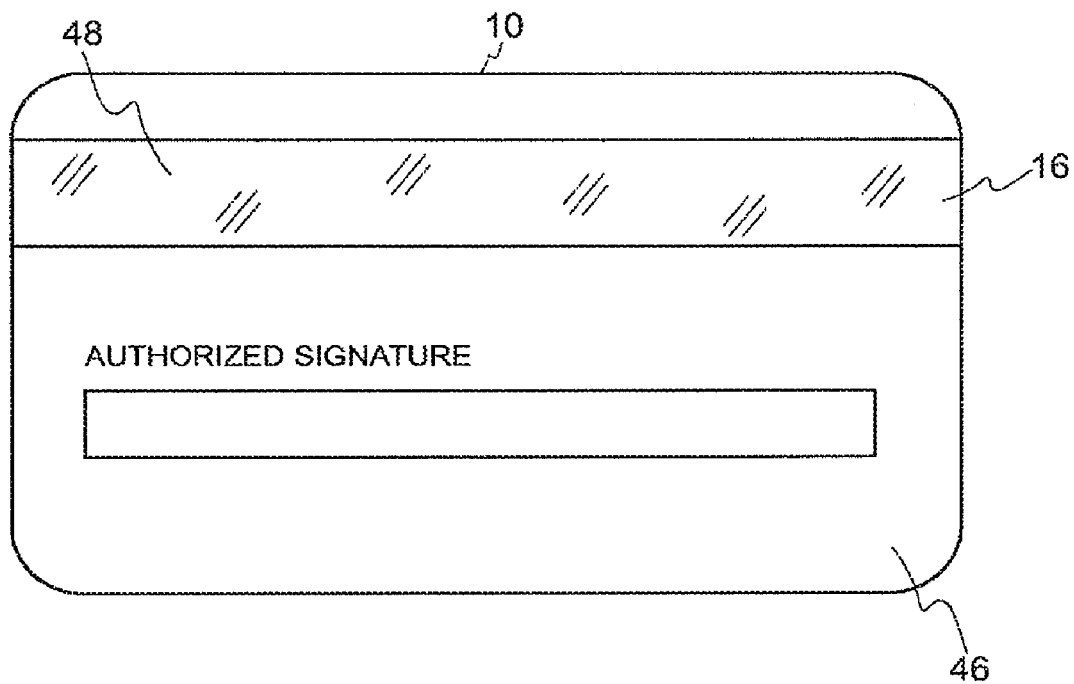
FIG. 4 illustrates an example of a payment card having a dynamic magnetic stripe portion in accordance with one embodiment of the present invention.

In one embodiment, a payment card 10 may be provided with a dynamic magnetic stripe 16 which includes a magnetic stripe 48 that is typically positioned along the length of the rear surface 46 of the payment card 10, as shown in FIG. 4. The magnetic stripe 16,48 contains payment card information so that when the payment card 10 is physically swiped through a magnetic payment device, the data encoded in the magnetic stripe 16,48 is read by the magnetic card reader. Through the use of a dynamic magnetic stripe 16, one or more portions of the magnetic stripe 48 of a payment card 10 can be magnetically altered. In one example, a dynamic magnetic stripe 16 includes a magnetic stripe writer or recorder 50 which can controllably change (i.e., write) one or more the values stored in the magnetic stripe 48 of a payment card 10.

Figure 2:
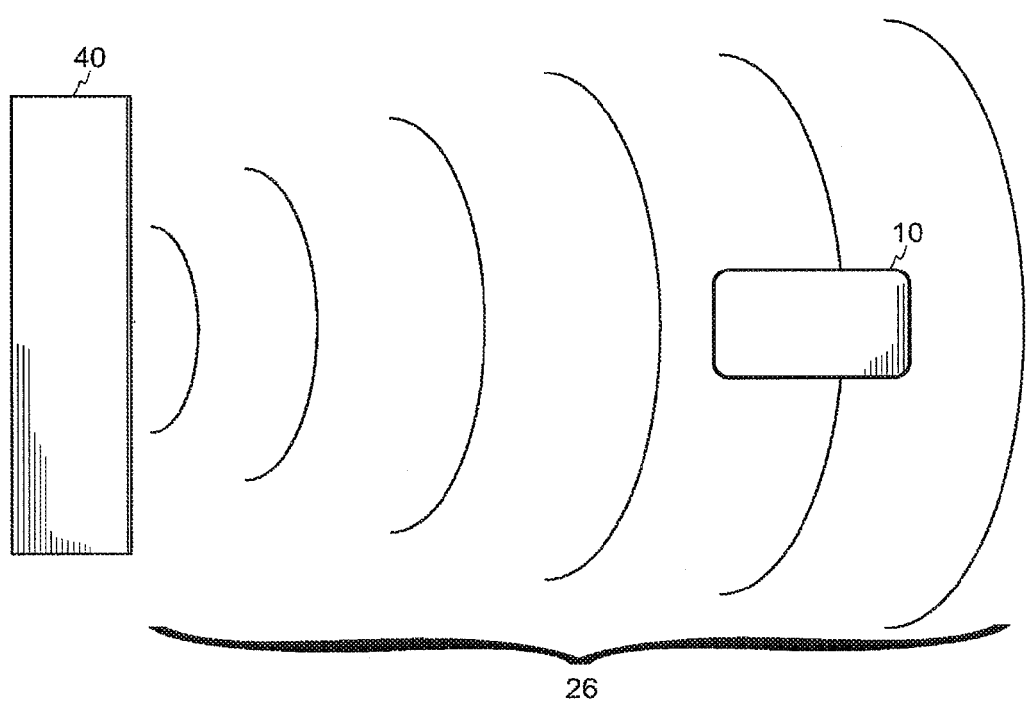
FIG. 2 illustrates a payment card, such as the payment card of FIG. 1, within an electro-magnetic (EM) field generated by a card reader device, in accordance with one embodiment of the present invention.

In one example embodiment, the dynamic magnetic stripe 16 can have new data encoded into the magnetic stripe 48 when the payment card is placed within the electro-magnetic field 26 of a contactless card reader device 40 (FIG. 2). By changing one or more of the values encoded in the magnetic stripe 48, some embodiments of the present invention can create unique transaction data which can enhance the security of the payment card 10.

FIGS. 5-8 illustrate examples of various operations that may be performed by, utilized with, or implemented within a payment card (such as payment card 10) in accordance with one or more embodiments of the present invention.

Figure 5:
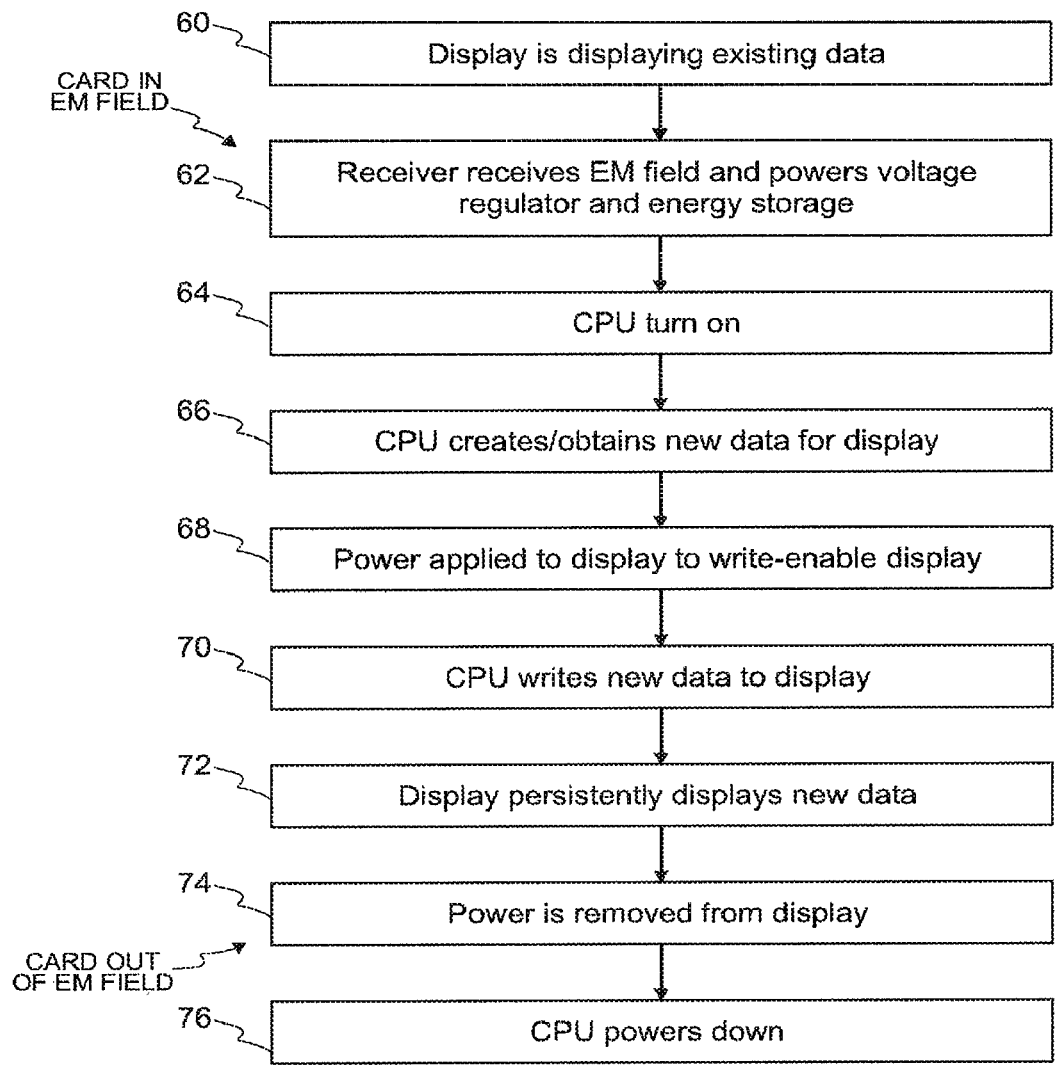
FIG. 5 illustrates an example of operations for controlling a display on a payment card using power from an external source, in accordance with one embodiment of the present invention.
Figure 6:
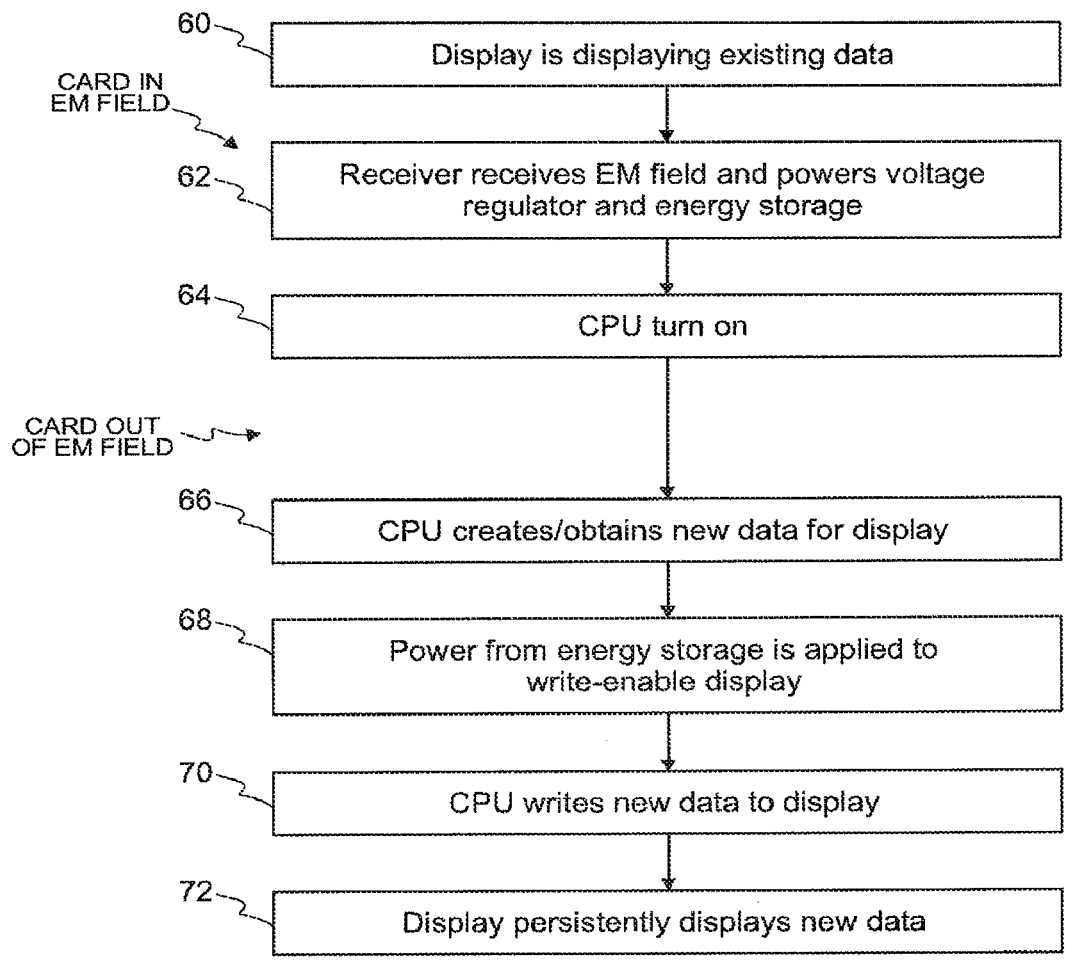
FIG. 6 illustrates another example of operations for controlling a display on a payment card using power from an external source, in accordance with one embodiment of the present invention.

FIGS. 5-6 illustrate examples of operations for changing the state or contents of a display 14 on a payment card 10 using power received from an external source, such as from an electro-magnetic/RF field 26, in accordance with some embodiments of the present invention. FIG. 5 illustrates an example of operations where the state or contents of the display 14 are changed while the payment card 10 is within the electro-magnetic/RF field 26, and FIG. 6 illustrates an example of operations for changing the state or contents of a display 14 after the payment card 10 is outside of the electro-magnetic/RF field 26.

Referring to FIG. 5, for purposes of this example, it is assumed that the display 14 has been previously written with existing data and is currently displaying such existing data, as shown in operation 60 (optional); however, one or more operations of FIGS. 5 and 6 can be utilized to initially write data to the display 14 for the first time.

At operation 62, having been placed in the electro-magnetic/RF field, a payment card receives electro-magnetic field energy and powers up (i.e., the contactless receiver 12 receives EM/RF energy, and the voltage regulator 22 and energy storage elements 20 of the payment card 10 are activated). At operation 64, the CPU is turned on utilizing the power received from the external electro-magnetic/RF field, for instance, as regulated by the voltage regulator 22. At operation 66, the CPU creates and/or obtains new data for display. The data to be displayed can include any type of data that is desired to be displayed, based upon the particular implementation. At operation 68, power is applied to the display in order to write-enable the display. In other words, operation 68 can be utilized to selectively apply power to the display in order to change the state or contents of the display. At operation 70, the CPU writes new data to the display, and at operation 72, the display displays the new data, preferably in a persistent manner. At operation 74, power is removed from the display, thereby disabling any further state changes to the contents of the display until a time in the future when new data is to be written to the display. The payment card may be removed out of the electro-magnetic/RF field, and at operation 76 the CPU may power down.

In FIG. 6, if desired, the new data may be written to the display after the payment card has been removed out of the range of the electro-magnetic/RF field, in one example. As shown in FIG. 6, after the payment card has been removed out of the electro-magnetic field, at operation 66 the CPU creates or obtains new data for the display, and at operation 68, power from the energy storage elements of the payment card is used and/or applied to write-enable the display. At operation 70, the CPU, operating under power obtained from the energy storage elements in this example, writes the new data to the display, and at operation 72, the display persistently displays the new data, in one example.

While operation 66 is shown as occurring after the payment card has been removed from electro-magnetic field, in another example operation 66 occurs before the payment card has been removed out of the electro-magnetic field, and operation 68 occurs after the payment card has been removed out of the electro-magnetic field.

Figure 7:
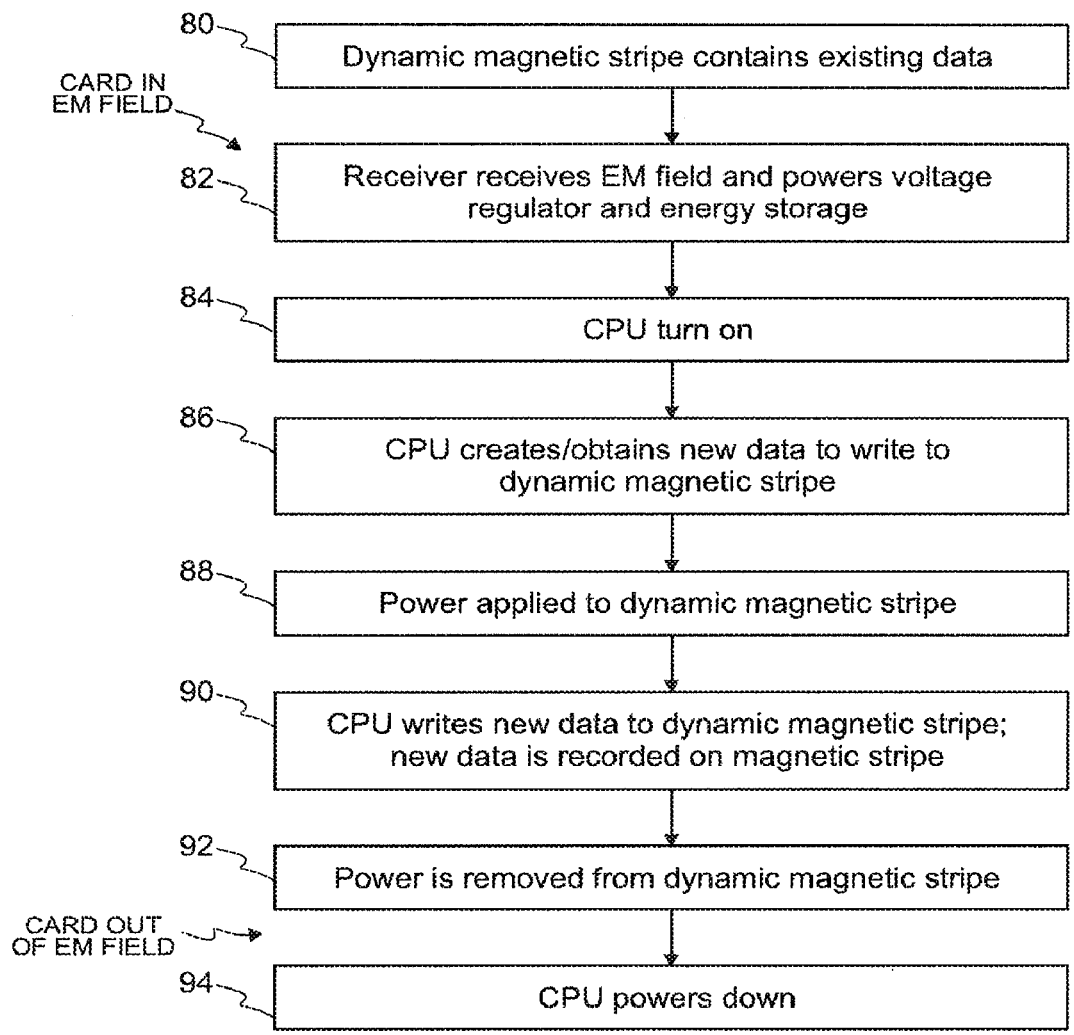
FIG. 7 illustrates an example of operations for controlling a dynamic magnetic stripe on a payment card using power from an external source, in accordance with one embodiment of the present invention.
Figure 8:
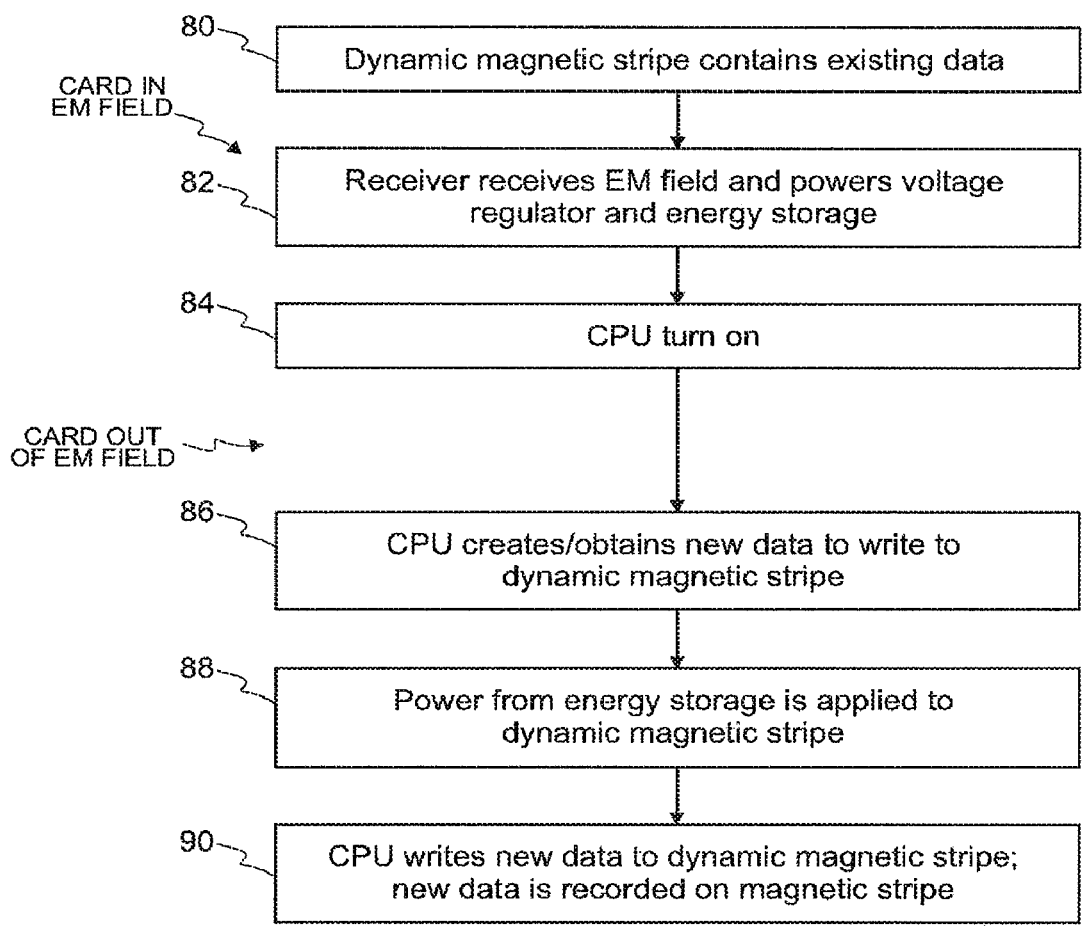
FIG. 8 illustrates another example of operations for controlling a dynamic magnetic stripe on a payment card using power from an external source, in accordance with one embodiment of the present invention.

FIGS. 7-8 show various embodiments of operations for controlling a dynamic magnetic stripe on a payment card (such as payment card 10) using power from an external source, such as from an electro-magnetic field, in accordance with some embodiments of the present invention. In FIG. 7, for purposes of this example, it is assumed that the dynamic magnetic stripe contains existing data and that operations 82-90 can be utilized to change the values stored or encoded in the magnetic stripe of the payment card. It is understood that operations 82-90 or variations thereof may be utilized to initially write one or more portions of the data contained in the magnetic stripe, if desired.

When the payment card is placed in the electro-magnetic/RF field, at operation 82, the payment card receives the electro-magnetic field and derives power therefrom (i.e., the voltage regulator 22 and/or energy storage elements 20 of the payment card 10 are powered from the EM field 26). At operation 84, the CPU turns on utilizing the power provided by the electro-magnetic/RF field (i.e., as converted by the contactless receiver 12 and voltage regulator 22, in one example). At operation 86, the CPU creates or obtains new data that is to be written to the dynamic portion of the magnetic stripe, which may include one or more data values encoded in the magnetic stripe.

At operation 88, power is applied to the dynamic magnetic stripe in order to enable the writing of new data to the dynamic magnetic stripe. At operation 90, the CPU writes new data to the dynamic magnetic stripe. Operation 90 records new data on one or more portions of the magnetic stripe, thereby changing the state of the dynamic magnetic stripe.

At operation 92, power is removed from the dynamic magnetic stripe (i.e., thereby disabling the write operation), and once the payment card is out of the range of the electro-magnetic/RF field, at operation 94, the CPU powers down.

In FIG. 8, the new data is written to the dynamic magnetic stripe after the payment card is out of the electro-magnetic field. In one example, at operation 86, the CPU creates or obtains new data to write to the dynamic magnetic stripe (although in other embodiments, this operation may occur while the payment card is within the electro-magnetic/RF field). At operation 88, power from the energy storage elements is utilized and applied to the dynamic magnetic stripe in order to write the new data thereto. At operation 90, the CPU writes the new data to the dynamic magnetic stripe, and the new data is recorded on one or more portions of the magnetic stripe of the payment card. Hence, operations 88-90 may occur after the payment card is out of the range of the electro-magnetic/RF field, in this example.

Accordingly, it can be seen that embodiments of the present invention may be configured to provide a payment card 10 having a display 14 and/or a dynamic magnetic stripe 16, wherein the payment card 10 does not utilize a battery therein.

In another example embodiment, a payment card 10 may include means for receiving (which may be included in receiver 12) an external electro-magnetic signal 26, such means 12 can include any conventional circuit or circuit element for receiving a EM signal, such as an inductor, antenna, capacitor, resistors, diodes, or other conventional circuit element or combination thereof. A payment card 10 may include means for converting (which may be included in receiver 12 or regulator 22) said electro-magnetic signal 26 to one or more electrical signals for powering the payment card, and such means may include a voltage regulator (of any conventional type), a level shifter, a voltage translator, a electrical signal converter, or other conventional circuit.

A payment card 10 may also include means for generating 18 one or more data signals, such as a CPU, logic, PLD (programmable logic device), an integrated circuit, microprocessor, microcontroller, or other conventional processor and may include other components which are conventionally associated with a CPU, such as on-board or external memory, interface circuits, timing circuits, clock circuits, or other conventional circuits, depending upon the particular implementation.

A payment card 10 may also include means for displaying 14 data, such as display, a fixed segment display, a dot matrix display, a positive or negative reflective display which can be read by the user or cardholder using ambient light, a liquid crystal display, or other conventional display.

A payment card 10 may also include means for storing 16 magnetically readable data, such as a dynamic magnetic stripe, a writable magnetic stripe, or any conventional magnetic storage mechanism.

A payment card 10 may also include means for storing 20 energy, said means may be coupled with the one or more electrical signals. Means for storing energy may include one or more electrical circuit elements, such as inductors, capacitors, or any conventional energy storage elements.

Embodiments of the invention can be implemented via appropriate software or computer program code instructions in combination with appropriate instruction execution platforms, processor(s), hardware or the like. These instructions may be in the form of a computer program product that can cause a CPU to control operation of a card according to an embodiment of the invention. The combination of hardware and software to perform the functions described can form the means to carry out the processes and/or subprocesses of embodiments of the invention. In this regard, each block in the flowchart or block diagrams may represent a module, segment, action, or portion of code, which comprises one or more executable instructions or actions for implementing the specified logical function(s). Furthermore, an embodiment of the invention may take the form of a hardware embodiment, a software embodiment (including firmware, resident software, micro-code, etc.) or an embodiment combining software and hardware aspects.

Any suitable computer usable or computer readable medium may be used, taking into account that computer program code to operate a card according to embodiments of the invention may reside at various places during assembly of the card, in addition to on a card itself. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with an instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out embodiments of the present invention may be written in an object oriented, scripted or unscripted programming language such as Java, Perl, Smalltalk, C++ or the like. However, the computer program code for carrying out embodiments of the present invention may also be written in conventional procedural programming languages, such as the "C" programming language or similar programming languages. It should also be noted that functions and combination of functions described herein can be implemented by special purpose hardware-based systems or operators which perform the specified functions or acts.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations are not a limitation of the present invention.

It should be appreciated that reference throughout this specification to "one embodiment" or "an embodiment" or "one example" or "an example" means that a particular feature, structure or characteristic described in connection with the embodiment may be included, if desired, in at least one embodiment of the present invention. Therefore, it should be appreciated that two or more references to "an embodiment" or "one embodiment" or "an alternative embodiment" or "one example" or "an example" in various portions of this specification are not necessarily all referring to the same embodiment.

It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. Inventive aspects lie in less than all features of a single foregoing disclosed embodiment, and each embodiment described herein may contain more than one inventive feature.

While the invention has been particularly shown and described with reference to embodiments thereof, it will be understood by those skilled in the art that various other changes in the form and details may be made without departing from the spirit and scope of the invention.

The invention claimed is:

1. A payment card comprising:
   a receiver to receive an external electro-magnetic signal, said receiver operable to convert said electro-magnetic signal to an electrical signal for powering the payment card;
   a CPU coupled with the electrical signal of the receiver, the CPU operable to generate one or more data signals; and
   a display to receive at least one of the one or more data signals from the CPU, wherein the display is operable to display security data and to receive power based on the electrical signal from the receiver,
   wherein, responsive to the electro-magnetic signal received by the payment card, the CPU changes the security data displayed on the display.

2. The payment card of claim 1, wherein the payment card does not include a battery.

3. The payment card of claim 1, wherein the security data displayed on the display changes after the payment card is used in a transaction.

4. The payment card of claim 1, wherein the display is a persistent display that, once written, is operable to display the security data persistently and maintain the display of the security data until the persistent display is re-written.

5. The payment card of claim 4, wherein the display is re-written after the payment card has been moved outside of an electro-magnetic field that produced the electro-magnetic signal.

6. The payment card of claim 1, wherein the CPU is operable to change the security data displayed on the display after the payment card has been moved outside of an electro-magnetic field that produced the electro-magnetic signal.

7. The payment card of claim 1, further comprising:
   a dynamic magnetic stripe to store magnetically readable data, the dynamic magnetic stripe operable to receive at least one of the one or more data signals, wherein based in part on the electro-magnetic signal received by the payment card, the CPU is operable to change one or more portions of the magnetically readable data contained in the dynamic magnetic stripe.

8. The payment card of claim 7, further comprising:
   a voltage regulator coupled with the receiver;
   one or more level shifting circuits coupled with the voltage regulator, the one or more level shifting circuits operable to convert a voltage at a first voltage level from the voltage regulator to a second voltage at a second voltage level, the second voltage adapted to be coupled with the dynamic magnetic stripe.

9. The payment card of claim 7, wherein the CPU is operable to change the magnetically readable data stored by the dynamic magnetic stripe after the payment card has been moved outside of an electro-magnetic field that produced the electro-magnetic signal.

10. A payment card comprising:
    a receiver to receive an external electro-magnetic signal, said receiver operable to convert said electro-magnetic signal to an electrical signal for powering the payment card;
    a CPU coupled with the electrical signal of the receiver, the CPU operable to generate one or more data signals; and
    a dynamic magnetic stripe to store magnetically readable data, the dynamic magnetic stripe operable to receive at least one of the one or more data signals from the CPU including unique transaction data, wherein the dynamic magnetic stripe is further operable to receive power based on the electrical signal from the receiver,
    wherein, responsive to the electro-magnetic signal received by the payment card, the CPU changes the unique transaction data stored on the dynamic magnetic stripe.

11. The payment card of claim 10, wherein the payment card does not include a battery.

12. The payment card of claim 10, wherein the unique transaction data is generated after the payment card is used in a transaction.

13. The payment card of claim 10, wherein the unique transaction data is generated after the payment card has been moved outside of an electro-magnetic field that produced the electro-magnetic signal.

14. The payment card of claim 10, further comprising:
    a display to receive at least one of the one or more data signals from the CPU, wherein the display is operable to display security data.

15. The payment card of claim 10, further comprising:
    a voltage regulator coupled with the receiver;
    one or more level shifting circuits coupled with the voltage regulator, the one or more level shifting circuits operable to convert a voltage at a first voltage level from the voltage regulator to a second voltage at a second voltage level, the second voltage adapted to be coupled with the dynamic magnetic stripe.

16. The payment card of claim 15, wherein the CPU is operable to change the magnetically readable data stored by the dynamic magnetic stripe after the payment card has been moved outside of an electro-magnetic field that produced the electro-magnetic signal.

17. A payment card comprising:
    a receiver to receive an external electro-magnetic signal, said receiver operable to convert said electro-magnetic signal to an electrical signal for powering the payment card;
    one or more energy storage elements, coupled with the receiver, to store energy received from the electro-magnetic signal;
    a CPU coupled with the electrical signal of the receiver, the CPU operable to generate one or more data signals;
    a display to receive at least one of the one or more data signals from the CPU and display data based on the one or more data signals,
    wherein, the CPU changes the data displayed on the display in response to the electro-magnetic signal received by the payment card.

18. The payment card of claim 17, wherein the one or more energy storage elements includes an inductor.

19. The payment card of claim 17, wherein the one or more energy storage elements includes a capacitor.

20. The payment card of claim 17, wherein the payment card does not include a battery.

21. The payment card of claim 17, wherein the display is a persistent display that, once written, is operable to display the security data persistently and maintain the display of the security data until the persistent display is re-written.

22. A payment card comprising:
a receiver to receive an external electro-magnetic signal, said receiver operable to convert said electro-magnetic signal to an electrical signal for powering the payment card;
one or more energy storage elements, coupled with the receiver, to store energy received from the electro-magnetic signal;
a CPU coupled with the electrical signal of the receiver, the CPU operable to generate one or more data signals; and
a dynamic magnetic stripe to store magnetically readable data, the dynamic magnetic stripe operable to receive at least one of the one or more data signals from the CPU, wherein the dynamic magnetic stripe is further operable to receive power based on the electrical signal from the receiver.

23. The payment card of claim 22, wherein the one or more energy storage elements includes an inductor.

24. The payment card of claim 22, wherein the one or more energy storage elements includes a capacitor.

25. The payment card of claim 22, wherein the one or more data signals from the CPU includes unique transaction data.

* * * * *